Figure 4:
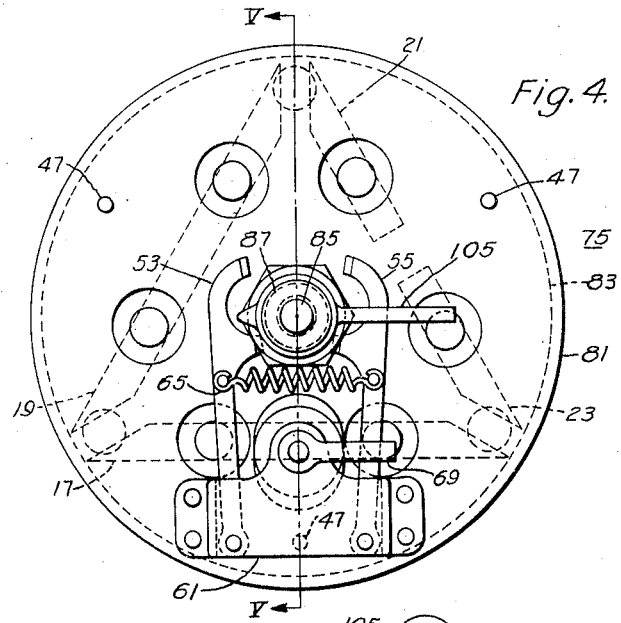

Dec. 3, 1935.  H. M. BIEBEL  2,023,119
RANGE CONTROL SYSTEM
Filed Feb. 8, 1935  2 Sheets-Sheet 1
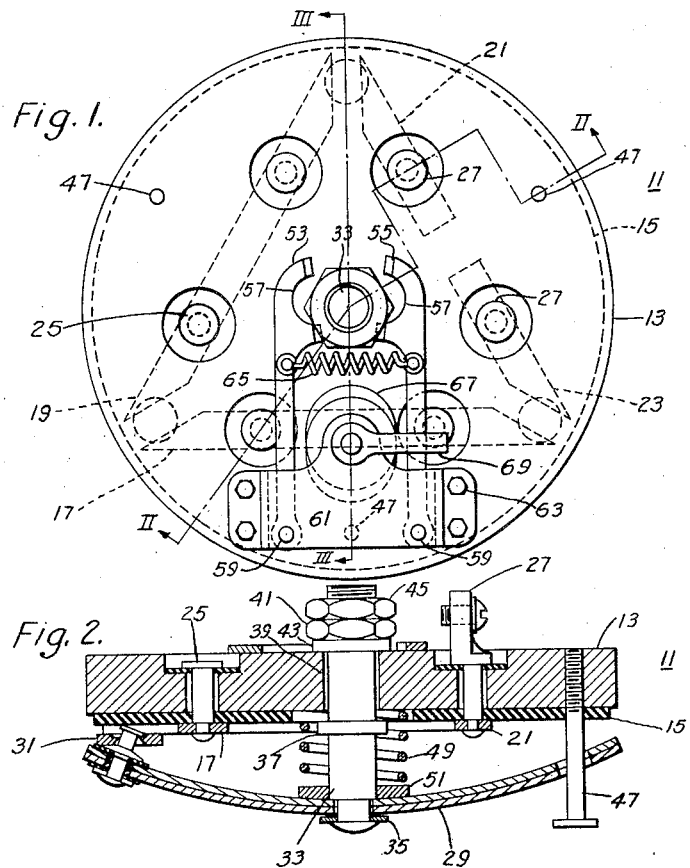
WITNESSES:
INVENTOR
Herman M. Biebel
BY
W. R. Coley
ATTORNEY Dec. 3, 1935.  H. M. BIEBEL  2,023,119
RANGE CONTROL SYSTEM
Filed Feb. 8, 1935  2 Sheets-Sheet 2

WITNESSES:

INVENTOR
Herman M. Biebel
BY
ATTORNEY

Patented Dec. 3, 1935

2,023,119

UNITED STATES PATENT OFFICE 2,023,119

RANGE CONTROL SYSTEM

Herman M. Biebel, Oakmont, Pa., assignor to Westinghouse Electric & Manufacturing Company, East Pittsburgh, Pa., a corporation of Pennsylvania Application February 8, 1935, Serial No. 5,593

10 Claims. (Cl. 219—20)

My invention relates to cooking devices and more particularly to temperature control systems for range ovens.

An object of my invention is to provide a relatively simple and easily installed and operated thermostatic means for obtaining a predetermined temperature cycle in a range oven.

Another object of my invention is to provide a single thermally actuable switch controlling a source of heat in a cooking device, such as a range oven, to obtain a short-time peak temperature and then a lower maintained average temperature in a cooking chamber.

Other objects of my invention will either be pointed out specifically in the course of the following description of one form of system embodying my invention, or will be apparent from such description.

In practicing my invention I provide, in combination with a range oven enclosing a cooking chamber, a single quick-acting thermostatic switch adapted to change its operating temperature after the first operation thereof, to control a heating element associated with the cooking chamber to obtain a short time peak temperature and then a lower maintained average temperature in the cooking chamber. I also provide for varying the operating temperatures of the thermostatic switch assembly constituting a part of my system.

It is well known that the proper cooking of a roast of meat involves first raising the temperature in the cooking chamber to a value on the order of 550° F. to sear the outside surface of the meat, to seal the juices therein, and to thereafter cook the meat by subjecting it to a maintained lower average temperature for a predetermined length of time until it has been cooked to the desired degree.

In a range of the kind now in use and heated either electrically or by gas, and provided with automatic thermally-actuable means for controlling the temperature in the cooking chamber, the operator will adjust the thermostatic device to so control the heat source that the initial temperature will be the desired searing temperature, which as noted above, may be 550° and will be maintained for a short period of time, and will then change the setting of the thermostatic device to cause it to operate at a lower temperature, which may be on the order of say 350° to 400°F.

Several different combinations of thermostatic switches to obtain the desired so-called "dual cycle" temperature control have been suggested but these usually require a plurality of such switches, whereas my present system employs a single thermally-actuable switch controlling a heat source either directly or indirectly, and which is adapted to automatically vary its operating temperature after it has once been actuated to deenergize the heat source.

Figure 5:
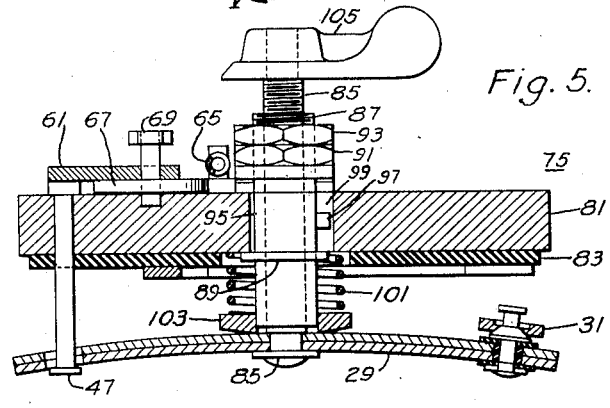
Figure 6:
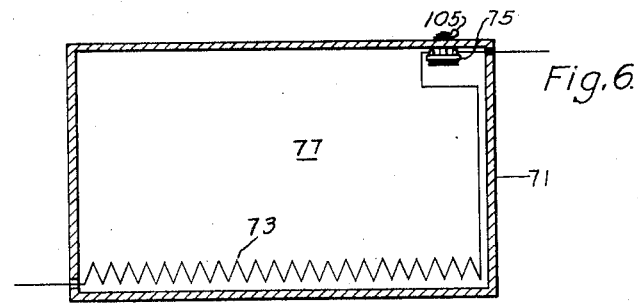

In the accompanying drawings:

Figure 1 is a top plan view of a thermostatic switch used in the system embodying my invention, Fig. 2 is a view in section therethrough taken on the line II—II of Fig. 1, Fig. 3 is a view in section through the device shown in Fig. 1, taken on the line III—III thereof and showing the thermal element in its open position, Fig. 4 is a top plan view of a modified form of thermal switch which I may use in the system embodying my invention, Fig. 5 is a view in lateral section taken on the line V—V therethrough showing the bimetal element in its open position, and Fig. 6 is a schematic view showing the thermal switch illustrated in Figs. 4 and 5 of the drawings as utilized to control an electric heater in a range oven.

Referring first to Figs. 1, 2 and 3 of the drawings, I have there illustrated a thermostatic switch assembly 11 which includes a base 13 of substantially circular shape and which may be made of metal. Adjacent to one face thereof there is located a sheet or disk 15 of electric-insulating material such as mica. A pair of fixed strip-type contact members 17 and 19 and a pair of similar fixed contact-and-terminal members 21 and 23 are arranged in general triangular relation against the outer face of sheet 15, being held thereagainst either by rivets 25 as used for the flat contact members or by combined rivet and terminal members 27 for the members 21 and 23.

A snap-acting bimetal disk 29 which is preferably of the reversible dished type disclosed and claimed in Patent 1,448,240 to J. A. Spencer, is associated with the base and contact and terminal members hereinbefore described. It is provided with three insulatedly-mounted contact bridging members 31 (only two being shown), one of which is adapted to engage the adjacent ends of contacts 17 and 19, the second of which is adapted to engage the adjacent ends of members 19 and 21, while the third contact bridging member is adapted to engage the adjacent ends of members 17 and 23.

Means for supporting the disk 29 centrally thereof is shown as comprising a stud 33, the disk 29 being mounted loosely thereon adjacent one reduced-diameter end thereof and held thereon as by a small washer 35 against which the reduced outer end portion of the stud 33 is hammered over. The stud 33 is provided further with an integral annular shoulder 37 intermediate its ends, for a purpose to be described, and is so designed and constructed as to slide freely longitudinally of its length within an opening 39 in the base 13. A first nut 41 having an annular end portion 43 thereon is screw threaded on the other end of stud 33 and is held by lock nut 45 in a manner well known in the art.

The disk 29, when in the one dished position shown in Fig. 2 of the drawings where the above described contact bridging members are in engagement with the fixed contact members, will exert a pull on the stud 33 tending to move it downwardly, as seen in Fig. 2 of the drawings, and it is to be noted that there will be a small clearance between the upper face of the annular flange 37 and the adjacent lower face of base 13.

When the disk 29 is subjected to a predetermined high temperature, which for illustrative purposes may be assumed to be 550°, it will move to its oppositely dished position as shown more particularly in Fig. 3 of the drawings, the amount of reverse dishing being limited by three stop pins 47 having screw threaded engagement with the base 13 and extending through openings in the disk adjacent to its periphery. The force exerted by disk 29 on the stud 33 will now be in an opposite direction and will tend to move it upwardly, as seen in Fig. 3 of the drawings, so that the upper face of shoulder 37 will be in engagement with the lower face of base 13. In order to insure that there will be no movement of the stud 33 until desired, I provide a helical spring 49 around the stud 33 between the base 13 and a flange 51 on the stud.

Means for retaining the stud 33 in its second or open position described above comprises a pair of wedge members 53 and 55, generally of bar shape and each having a recessed end indicated by 57 in Fig. 1 of the drawings, the other ends of the two bars being pivotally mounted as at 59 on a plate 61 which is suitably secured against the upper face of base 13 as by a plurality of small bolts 63. The two wedge arms are urged together by a helical spring 65, the ends of which are secured to intermediate portions of the respective wedge arms 53 and 55. Normally, the recessed edge portions of wedge arms 53 and 55 will engage the annulus 43 of the first nut 41 when the stud 33 is in the position shown in Fig. 2 of the drawings. However, when the stud has been moved to the upper position shown in Fig. 3 of the drawings the wedges 53 and 55 are permitted to move under the annular shoulder 43 or between its lower face and the upper face of base 13, being urged into such position by the spring 65.

Means for forcing the wedge ends out from under the annulus 43 and into their original positions as shown in Fig. 1 of the drawings may comprise a pivotally mounted cam member 67 of oval shape actuable by an arm 69 which is pivotally mounted in plate 61.

The operation of this device may be described briefly as follows, having reference also to Fig. 6 of the drawings wherein I have illustrated a range oven structure 71 adapted to be heated by an electric resistor 73, both the oven structure and the heater being shown schematically.

While the thermostatic switch illustrated generally in Fig. 6 of the drawings is that shown in Figs. 4 and 5 of the drawings, the same explanation will hold and it is, therefore, to be assumed that the thermostatic switch 75 shown in Fig. 6 of the drawings has been replaced by switch 11. It is to be further understood that a main switch for manually controlling the energization of the heating element 73 is provided and that any other desired control device such as a time clock may be provided, but since these constitute no essential part of my invention they have not been illustrated.

Let it be assumed that the operator desires to cook a roast of meat in the oven chamber 77 and has closed the main circuit controlling switch (not shown). As shown in Fig. 6, the thermostatic device 11 or 75 is suitably supported in direct heat receiving position in the cooking chamber 77 so that it will follow closely any temperature variations therein caused by the source of heat 73. Let it be further assumed that the design and construction of the thermostatic switch 11 and particularly of the disk 29 is such that when in the position shown in Fig. 2 of the drawings and with the heat source suitably energized to raise the temperature in the oven, it will move with a sudden action to its open position, as shown in Fig. 3 of the drawings, and that this operation will occur at a temperature of say 550° F. This temperature is selected since it has been found to be a suitable temperature to cause searing of the outside surface of a roast of meat.

As has already been stated, when the disk 29 snaps to its second or open position, the outer portions thereof through which the stop pins 47 extend will engage the stop pins, as shown in Fig. 3 of the drawings, and cause the stud 33 to move upwardly, as seen in Fig. 3 of the drawings, thereby permitting the spring-biased wedge ends of members 53 and 55 to move under the annulus 43 to thereby hold the stud and, consequently, the disk in a new position where the reverse dishing of the disk 29 is not as great as it was originally and as shown in Fig. 2 of the drawings. The stud 33 is now held substantially fixed or rigid in the position shown in Fig. 3 of the drawings, and it may be assumed for illustrative purposes that the disk 29 will move to its closed position at a temperature of say 350° F. Since the dish of the disk is less or, to state in other words, its radius of curvature is greater, it will open at a lower temperature than before, which temperature may, for illustrative purposes, be considered to be 400° F. Thus, the first opening movement of disk 29 resulted in deenergizing the heat source 73, the first reclosing thereof resulted in reenergizing the heat source 73 at a temperature of 350° F., while the second opening of the disk will be effected at about 400° F., the disk thereafter closing and opening the circuit of the heating element at those temperatures as long as may be desired by an operator. The temperature cycle obtainable is, therefore, that of a short time maximum or peak temperature, on the order of 550°, a reduction of the chamber temperature to a value on the order of 350° and a reopening of the thermostatic switch at say 400° with alternate reclosing and reopening of the circuit of the heat source to thereby maintain an average of say 375°.

The device illustrated in Figs. 1, 2 and 3 of the drawings, therefore, constitutes a single thermostatic switch comprising a part of a temperature control system for a cooking chamber, which system is effective to operate to provide a short-time peak temperature in the cooking chamber and thereafter a lower maintained average temperature in the cooking chamber for as long as may be desired by the operator or as determined by other elements usually utilized in range ovens, such as a time clock. It is to be noted that the thermostatic switch constituting a part of the system embodying my invention utilizes the reactive effect of a snap-acting disk when moving from its initial closed position to its open position, and thereafter operating at new upper temperature limits and at the same lower temperature limit to interrupt and reclose the energizing circuit.

In order to restart the control system after shutting it down it is only necessary for the operator to actuate handle 69 through substantially 90° when the cam member 67 will engage the arms 53 and 55 intermediate their ends to force them apart, whereupon the action of the disc 29 and the spring 49 will cause stud 33 to move to its original position substantially as shown in Fig. 2 of the drawings.

When it is desired to be able to vary the operating values both of the peak temperature and of the maintained lower temperature, I may use the structure shown in Figs. 4 and 5 of the drawings. A base 81, which is substantially the same as base 13 and has a disk 83 of electric-insulating material such as mica mounted thereon, together with substantially the same fixed contact terminals and terminal members 17, 19, 21 and 23, has operatively associated therewith a snap-acting bimetal disc 29 which is mounted on a stud 85 in substantially the same manner as the disk 29 was described as being mounted on the end of stud 33. The stud 85 is provided with external screw threads and interfits with a movable hollow or tubular stud 87, which stud 87 is the counterpart of axially movable stud 33 hereinbefore described. Stud 87 is provided with an integral collar or flange 89 intermediate its ends and has a first or inner nut 91 and a lock nut 93 at its upper end which are the counterpart of nuts 41 and 45 in the device shown in Figs. 1, 2 and 3 of the drawings. Stop pins 47 are provided, preferably three in number, as was hereinbefore described.

The tubular stud 87 is adapted to move axially in an opening 95 in base 81 and is prevented from peripheral movement relatively thereto as by a pin 97 therein moving in an axial groove 99 in base 81. A spring 101 is provided around the tubular stud 87 between flange 103 on the lower end of stud 87 and the lower face of base 81.

Substantially the same wedge arms 53 and 55, helical spring 65 and the plate 61 pivotally supporting the ends of arms 53 and 55 are provided, as well as the cam member 67 and arm 69, as were hereinbefore described in connection with the device shown in Figs. 1 and 2. The upper end of rod or stud 85 is provided with a manually-actuable adjusting arm 105 so that an operator may initially adjust the position of the central part of the disk 29 to any desired value and it is to be understood that a suitable scale (not shown in the drawings) may be provided on the outside of the oven structure 71 so that an operator may be aware of the operating temperature of the adjusted thermostatic switch 75.

As has already been set forth, the greater the initial dishing of the disk 29, the higher will be its opening temperature. Therefore, if the operator adjusts arm 105 and supporting rod 85 in such manner as to decrease the amount of dish of the bimetal disk 29 when the switch is in its closed position, the lower will be the upper temperature at which the disk 29 snaps to its open position, as shown in Fig. 5 of the drawings. On the other hand, if he so moves arm 105 as to increase the initial dishing of the disk, the higher will be the initial temperature at which the circuit of the heat source is opened. The same comments hold with regard to the upper and the lower operating temperatures of the disk in its adjusted position, that is, when the tubular stud 87 has been moved to the position shown in Fig. 5 of the drawings, it being evident that an operator may adjust the position of the central portion of the disk relatively to the tubular stud 87 by turning actuating arm 105.

The system embodying my invention and comprising a single thermostatic switch so designed and constructed as to provide different operating values of the switch automatically and by the reactive effect of the first operation of a snap-acting bimetal element, thus provides a single control element operable to obtain an adjustable peak temperature in a cooking chamber and to thereafter obtain a lower maintained adjustable average temperature in the cooking chamber as may be desired or required for the cooking of different kinds of food.

It is, of course, obvious that if the operator permits the wedges to remain in the positions to which they are moved after the first operation of the bimetal element, no peak temperature will be obtained but that only a desired adjustable lower maintained average temperature is obtainable.

It is further obvious that the system embodying my invention is not dependent upon the particular form of snap acting bimetal element or wedging means, but that it may be practiced with any other form of snap-acting thermally actuable element or wedging mechanism, or the equivalent.

Hence, I desire it to be understood that I do not desire to be limited to the particular details of the switch as shown and that the patent protection is to be limited only by the prior art or by the appended claims.

I claim as my invention:

1. In combination with a cooking device including a cooking chamber and an electric heating element therefor, means for controlling the heating element to obtain a short time peak temperature and then a lower maintained average temperature in the cooking chamber, said means comprising a pair of relatively movable cooperating contact members in circuit with the heating element, a snap-acting bimetallic device supporting and actuating one of said contact members, means operatively associated with the bimetal device to initially govern the heating element to interrupt its circuit at a predetermined peak temperature and means automatically set in operation when the bimetal device moves to its interrupting position to change the adjustment to cause the bimetal device thereafter to operate to maintain a lower average temperature value in the cooking chamber.

2. In combination with a cooking device including a cooking chamber and a source of heat therefor, means for controlling the source of heat to obtain a short time peak temperature and then a lower maintained temperature in the cooking chamber, said means comprising a pair of relatively movable cooperating contacts controlling the energization of the heat source, a bimetal element actuating one of said contacts in accordance with temperature variations in the cooking chamber, means operatively associated with the bimetal element to initially support the same to effect disengagment of the cooperating contacts at a predetermined peak temperature, and means automatically operable by the opening movement of the bimetal element to change its condition to thereafter operate to effect sequential disengagement of the contact members at a lower temperature value.

3. In combination with a cooking device including a cooking chamber and a source of heat therefor, means for controlling the source of heat to obtain a short time peak temperature and then a lower maintained temperature in the cooking chamber, said means comprising a base, relatively movable cooperating contact members at least one of which is supported by said base and controlling the energization of the heat source, a quick-acting bimetal element actuating one of the contact members in accordance with temperature variations in the cooking chamber, means supporting the bimetal element from the base initially in a position to cause it to move to open position at a certain peak temperature, and automatic means operable upon opening movement of the bimetal element to hold the supporting means in a second position relatively to the base to cause it to effect engagement of the cooperating contact members at a lower temperature thereafter.

4. In combination with a cooking device including a cooking chamber and a source of heat therefor, means for controlling the source of heat to obtain a short time peak temperature and then a lower maintained average temperature in the cooking chamber, said means comprising a base, a pair of contacts controlling the energization of the heat source, a thermostatic element movable from one to another of two operative positions with a snap action and acting one of the contacts, means supporting the thermostatic element from the base, said means being movable relatively to the base and held in a position by the thermostatic element to effect disengagement of the contact members at a peak temperature, and means rendered effective upon the first disengaging movement of the thermostatic element to vary the position of the supporting means to cause the thermostatic element to sequentially disengage the contact members at a lower temperature.

5. In combination with a cooking device including a cooking chamber and an electric heater therefor, means for controlling the heater to obtain a short time peak temperature and then a lower maintained average temperature in the cooking chamber, said means including a pair of cooperating contacts controlling the energization of the heater, a bimetal element responsive to chamber temperature having two opposed operative positions and actuating one of said contacts, a support for the bimetal element to cause it to effect disengagement of the contacts at a peak temperature and means set in operation by the reactive effect of the bimetal element upon effecting disengagement of the contact members the first time to cause the support to move the bimetal element to effect disengagement of the contacts at a lower temperature.

6. In combination with a cooking device including a cooking chamber and an electric heater therefor, means for controlling the heater to obtain a short time peak temperature and then a lower maintained average temperature in the cooking chamber, said means including a single thermally-actuable switch controlling the energization of the heater and operable to deenergize the heater at a predetermined peak temperature, said switch including means set in operation by the first opening movement thereof to cause it to operate to deenergize the heater thereafter at a lower temperature.

7. In combination with a cooking device including a cooking chamber and an electric heater therefor, means for controlling the heater to obtain a short time peak temperature and then a lower maintained average temperature in the cooking chamber, said means including a single thermally-actuable switch responsive to chamber temperature controlling the energization of the heater and initially operative at a predetermined peak temperature to open the heater circuit and to reclose the heater circuit at a predetermined low temperature, said switch comprising means set in operation by the first opening movement thereof to cause it thereafter to operate at a lower opening temperature and the same closing temperature to maintain a lower average temperature in the cooking chamber.

8. In combination with a cooking device including a cooking chamber and an electric heater therefor, means for controlling the heater to obtain a short time peak temperature and then a lower maintained average temperature in the cooking chamber, said means including a single thermally-actuable switch controlling the energization of the heater and operable to deenergize the heater at a predetermined peak temperature, said switch including wedging means set in operation by the first opening movement of the switch to cause it to operate to deenergize the heater thereafter at a lower temperature.

9. The system as set forth in claim 7 in which the switch includes relatively movable supporting members and the means set in operation by the first opening movement includes a wedging means cooperating with a relatively movable supporting means to hold them in different relative positions after the first operation of the switch.

10. In combination with a cooking device including a cooking chamber and an electric heating element therefor, means for controlling the heating element to obtain a short time peak temperature and then a lower maintained average temperature in the cooking chamber, said means comprising a pair of relatively movable cooperating contact members in circuit with the heating element, a thermostatic device supporting and actuating one of said contact members, means operatively associated with the thermostatic device to initially govern the heating element to interrupt its circuit at a predetermined peak temperature and means automatically set in operation when the thermostatic device moves to its interrupting position to change the adjustment to cause the thermostatic device thereafter to operate to maintain a lower average temperature value in the cooking chamber.

HERMAN M. BIEBEL.